United States Patent [19]

Shah

[11] Patent Number: 4,988,080

[45] Date of Patent: Jan. 29, 1991

[54] VARIABLE RATE LEAF SPRING CONSTRUCTION

[75] Inventor: Rashmikant P. Shah, Wauwatosa, Wis.

[73] Assignee: A. O. Smith Corporation, Milwaukee, Wis.

[21] Appl. No.: 399,163

[22] Filed: Aug. 25, 1989

[51] Int. Cl.$^5$ ............................................... F16F 3/10
[52] U.S. Cl. ........................................ 267/30; 267/47
[58] Field of Search .................. 267/30, 47, 51, 52, 267/149; 280/718

[56] References Cited

U.S. PATENT DOCUMENTS

| | | | |
|---|---|---|---|
| 2,202,786 | 5/1940 | Weber | 267/30 |
| 2,222,001 | 11/1940 | Schulze | 267/51 |
| 2,659,595 | 11/1953 | Coda | 267/30 |
| 2,942,870 | 6/1960 | Balding | 267/52 |
| 2,969,230 | 1/1961 | Scheublein et al. | 267/30 X |
| 2,973,952 | 3/1961 | Heintzelman | 267/30 |
| 3,606,376 | 9/1971 | Hickman . | |
| 4,519,591 | 5/1985 | Bush et al. | 267/47 X |
| 4,671,535 | 6/1987 | Hanson et al. | 280/718 |
| 4,750,718 | 6/1988 | Nickel | 267/49 |

FOREIGN PATENT DOCUMENTS

| | | | |
|---|---|---|---|
| 231960 | 4/1925 | United Kingdom | 267/30 |
| 716767 | 10/1954 | United Kingdom | 267/30 |
| 915402 | 1/1963 | United Kingdom | 267/30 |

*Primary Examiner*—Duane A. Reger
*Attorney, Agent, or Firm*—Andrus, Sceales, Starke & Sawall

[57] ABSTRACT

A variable rate leaf spring construction for a vehicle including a composite leaf spring composed of fiber reinforced resin. The ends of the spring are adapted to be connected to the frame of the vehicle and an axle is mounted to the central portion of the spring. A resilient bumper is mounted on the frame and is disposed to be engaged by the spring as a load is applied to the frame. The bumper is tapered downwardly and the lower end of the bumper terminates in a generally rounded tip. The rounded tip provides a low or soft spring rate on initial contact with the leaf spring, while further loading will compress the bumper to provide a higher spring rate.

11 Claims, 1 Drawing Sheet

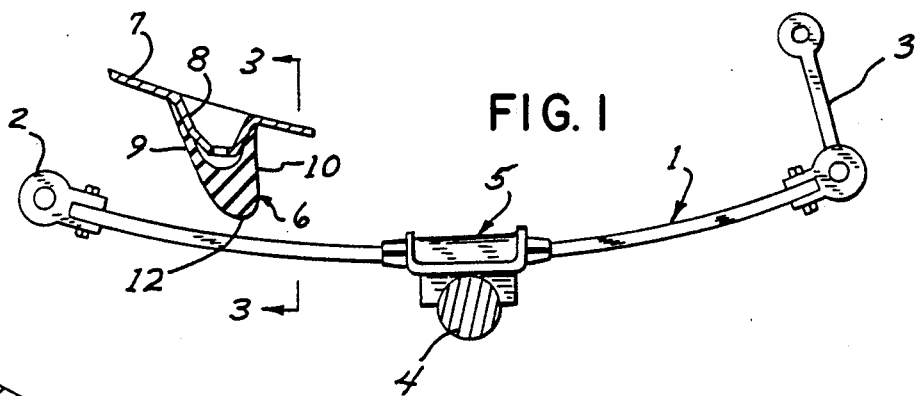
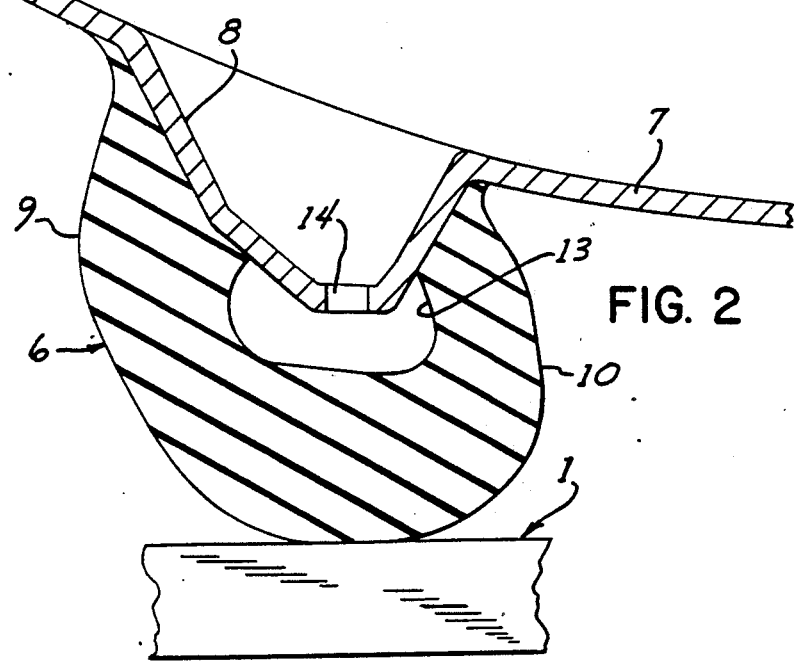
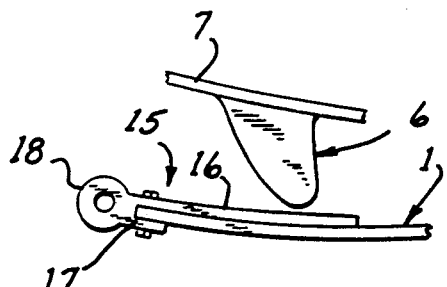
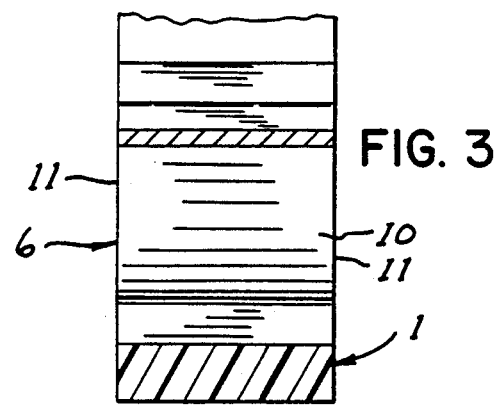

VARIABLE RATE LEAF SPRING CONSTRUCTION

BACKGROUND OF THE INVENTION

Certain vehicles, such as light trucks and vans, frequently incorporate a dual rate suspension system, in which a low or soft spring rate is achieved during normal driving conditions and a higher spring rate is obtained under higher load conditions.

In the past, a dual spring rate has been achieved by utilizing multiple steel leaves of decreasing length. The main leaf will carry the load under normal driving conditions, but when an increased load is encountered the main leaf will deflect into contact with the secondary leaves to increase the spring rate to the designated level.

Recently fiber reinforced resin leaf springs have been utilized with vehicles in place of steel leaf springs and the use of the composite springs provides a distinct decrease in weight. U.S. Pat. No. 4,750,718 describes a dual rate leaf spring construction utilizing a composite spring formed of fiber reinforced resin. In accordance with the aforementioned patent, a secondary leaf spring is secured beneath and parallel to the main composite spring and the secondary spring has a substantially shorter length than the main spring and is therefore less flexible. Mounted on each end of the secondary spring is an elastomeric pad having an upwardly extending rounded head that is adapted to be engaged by the lower surface of the main leaf spring under load conditions. When a predetermined heavy load is applied to the vehicle, the main spring will be deflected downwardly into engagement with the pads to thereby provide an increased spring rate to accept the heavier loads.

There has been a recent trend toward lower profile vans and light trucks to provide more aerodynamic styling. The lower profile reduces the space for the suspension system, and as a result, conventional dual rate suspension systems, which utilize a plurality of leaf springs, cannot be used as multiple leaves would impinge on the ground clearance. Thus, there has been a need for a dual rate suspension system that can be incorporated with low profile vehicles having a limited space for the suspension system.

SUMMARY OF THE INVENTION

The invention is directed to a variable rate suspension system for a vehicle that incorporates a single composite leaf spring composed of fiber reinforced resin. The ends of the spring are connected to the frame of the vehicle, while the central portion of the spring is connected to the vehicle axle via an axle mount unit.

In accordance with the invention, a resilient bumper is mounted on the frame in position to be engaged by the upper surface of the spring as a load is applied to the vehicle frame. The bumper is tapered downwardly and the lower end terminates in a generally rounded tip. The flexible rounded tip provides a low soft spring rate on initial contact with the leaf spring, while further loading will compress the bumper to provide a higher spring rate. At extreme load conditions, approaching the end of axle travel, the spring rate will remain substantially constant.

In a modified form of the invention, one of the flanges of the connecting eye at the front end of the spring is extended longitudinally, and the lower end of the bumper is adapted to engage the flange under load conditions. As the bumper engages the metal flange, there is no possibility of abrasion of the upper surface of the spring, as could occur in the event that foreign materials or particles, were lodged between the bumper and the spring surface.

The invention provides a variable rate spring system having a relatively low or soft spring rate on initial loading, and having a high spring rate for increased loading.

The resilient bumper also serves as an additional stop to limit axle travel under extreme load conditions.

The leaf spring construction is of compact design, incorporating only a single composite leaf spring, and thus can be incorporated with low profile vehicles having limited space for the suspension system.

As the invention incorporates a composite leaf spring, it is lighter in weight than conventional suspension systems utilizing steel leaf springs.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of the dual rate spring of the invention, with the spring being shown under no-load conditions;

FIG. 2 is an enlarged fragmentary side elevation showing the spring under load conditions;

FIG. 3 is a section taken along line 3—3 of FIG. 1; and

FIG. 4 is a fragmentary side elevation of a modified form of the spring construction.

DESCRIPTION OF THE ILLUSTRATED EMBODIMENT

FIGS. 1-3 illustrate a variable rate spring construction for a vehicle having particular use for light trucks and vans. The spring construction includes a composite leaf spring 1 formed of fiber reinforced resin. Spring 1 is generally rectangular in cross section and has a constant cross sectional area throughout its length.

The fiber reinforcement for spring 1 is preferably in the form of substantially continuous fibers which extend the length of the spring and the fibers may take the form of glass fibers, graphite fibers, or the like. The fibers are bonded by a thermosetting resin, such as an epoxy or polyester resin.

An eye 2 is connected to the forward end of spring 1 and provides a connection to the vehicle frame, while a standard shackle 3 is secured to the rear end of the spring and also provides a connection to the frame.

The vehicle axle 4 is mounted to the central portion of spring 1 through an axle mounting unit 5 which may be similar to that described in copending U.S. patent application Ser. No. 07/226,460, filed Aug. 1, 1988. The axle mounting mechanism is a type which will secure the axle to the leaf spring without the necessity of forming holes in the leaf spring which could sever the fibers and detract from the mechanical properties of the spring.

In accordance with the invention, a resilient or elastomeric bumper 6 is mounted on the frame 7 and is adapted to engage the upper surface of leaf spring 1 under load conditions. As shown in FIG. 1, frame 7 is provided with a downwardly extending well or recess 8 and the bumper 6 is secured around the well, preferably by vulcanizing.

Bumper 6 is provided with a front surface 9, a rear surface 10, and a pair of side surfaces 11. The front and rear surfaces converge downwardly and are joined at a generally rounded tip 12, while surfaces 11 are generally parallel. As seen in FIG. 3, the bumper 6 has a width substantially the same as the width of spring 1.

As an aid in providing the desired spring rate for bumper 6, the upper portion of the bumper is formed with a cavity or recess 13 which faces the lower surface of well 8. One or more holes 14 are formed in well 8 and when the bumper is compressed under load conditions, air in the cavity 13 can be vented through the hole 14.

Under no-load conditions, the lower tip 12 of bumper 6 will be spaced slightly above the upper surface of spring 1. As a load is applied, such as encountered under normal driving conditions, the upper surface of spring 1 will engage the tip 12 and the compression of the tip will provide a relatively low or soft spring rate under the light load conditions. As the load is increased, the bumper 6 will be compressed, as shown in FIG. 2 and the compression of the upper portion of the bumper will provide a higher spring rate to withstand the increased load. The bumper is designed, so that as maximum axle travel is approached, the spring rate of the bumper 6 will remain substantially constant and will not further increase. The term "axle travel" refers to the relative movement between the axle and the frame as a load is applied to the vehicle and the frame is lowered toward the axle.

FIG. 4 shows a second form of the invention, in which a modified form of a connector is employed to connect the forward end of spring 1 to the vehicle frame. In this embodiment, the connector 15 includes a pair of parallel flanges 16 and 17 which are joined to eye 18. Flanges 16 and 17 are connected to spring 1 by rivets which extend through aligned holes in the flanges and the end of the spring. As the rivet holes in the spring 1 are in a low stress area, the holes will not appreciably detract from the mechanical properties of the spring.

As seen in FIG. 4, the upper flange 16 is extended longitudinally along the spring to a position where it will be contacted by the lower tip of bumper 6. With the construction of FIG. 4, potential abrasion of the upper surface of spring 1 is avoided, as could occur if foreign materials, such as gravel or dirt, was located at the interface of contact between the bumper and the spring. Thus, the elongated flange 16 provides a wear surface which eliminates the possibility of abrasion of the upper surface of spring 1.

The resilient or rubber bumper 6 provides a variable spring rate which is designed to provide a low spring rate under minimum load conditions and a high spring rate under increased load conditions. The bumper is further designed so that as the limit of maximum axle travel is approached, the spring rate will remain at a constant high level and will not further increase.

A vehicle frame normally includes a stop or cushion which limits the axle travel. The bumper 6 of the invention also functions as a stop to limit axle travel so that under conditions of maximum axle travel, the load is carried not only by the normal stop, but also through the compressed bumper.

As the construction of the invention utilizes only a single composite leaf spring, it is compact and can be used with low profile vehicles having reduced space for the suspension system.

Various modes of carrying out the invention are contemplated as being within the scope of the following claims particularly pointing out and distinctly claiming the subject matter which is regarded as the invention.

I claim:

1. A variable rate spring construction for a vehicle, comprising a leaf spring composed of a single leaf of fiber reinforced resin, connecting means for connecting the ends of the spring to a vehicle frame, axle mounting means for connecting the central portion of the spring to a vehicle axle, and a resilient bumper having an upper end connected to the frame of the vehicle and disposed to engage the upper surface of the leaf springs under load conditions, said bumper being tapered downwardly with the upper end of the bumper having a larger longitudinal dimension than the lower end and the lower end terminating in a generally rounded tip, said bumper having a low spring rate on initial axle travel during loading and having a higher spring rate at a second position of axle travel during increased loading prior to reaching a maximum position of axle travel.

2. The spring construction of claim 1, wherein said bumper has a relatively constant spring rate from said second position of axle travel to said maximum position of axle travel.

3. The spring construction of claim 1, wherein the transverse width of said bumper is substantially equal to the width of said spring.

4. The spring construction of claim 1, wherein said bumper is disposed between said axle mounting means and the forward end of said spring.

5. The spring construction of claim 1, wherein said spring is generally rectangular in cross section and has a constant cross sectional area throughout its length, said tip being generally straight in a transverse direction.

6. The construction of claim 1, wherein the upper end of said bumper is provided with a cavity facing the lower surface of said frame.

7. The spring construction of claim 6, wherein said frame is provided with a hole communicating with said cavity to vent air from said cavity as the bumper is compressed.

8. The construction of claim 1, wherein the connecting means at an end of said leaf spring comprises an eye, and a pair of generally parallel spaced flanges extending longitudinally from said eye, and fastening means for securing said end of said spring between said flanges, the lower tip of said bumper being disposed to engage one of said flanges.

9. The spring construction of claim 8, wherein said one flange has a greater length than the other flange.

10. The construction of claim 8, wherein said flanges are metal.

11. The construction of claim 1, wherein said frame includes a downwardly extending well and said bumper is secured to the lower surface of said well.

* * * * *